United States Patent [19]
Diefendorf

[11] 3,811,917
[45] May 21, 1974

[54] BORON DEPOSITION ON CARBON MONOFILAMENT

[75] Inventor: Russell J. Diefendorf, Elnora, N.Y.

[73] Assignee: Great Lakes Carbon Corporation, New York, N.Y.

[22] Filed: Oct. 5, 1970

[21] Appl. No.: 78,061

[52] U.S. Cl. .......................... 117/47 R, 117/106 R
[51] Int. Cl. .......................................... C23c 11/00
[58] Field of Search...... 117/106 R, 119.6, DIG. 10, 117/DIG. 11, 231, 69, 217, 223, 228, 118, 71, 47

[56] References Cited
UNITED STATES PATENTS

| 3,369,920 | 2/1968 | Bourdeau et al. | 117/106 R |
| 3,365,330 | 1/1968 | Hough | 117/106 R |
| 3,053,636 | 9/1962 | Bean et al. | 117/231 |
| 3,479,205 | 11/1969 | Morelock | 117/106 R |
| 3,409,469 | 11/1968 | Kuntz | 117/106 C |
| 3,574,649 | 4/1971 | Fanti et al. | 117/106 R |
| 3,549,424 | 12/1970 | Rice | 117/106 R |

OTHER PUBLICATIONS

Campbell et al., Trans. Of Electrochemical Soc., Vol. 96, No. 5, Nov. 1949, pp. 318–333.

Primary Examiner—Ralph S. Kendall
Attorney, Agent, or Firm—Donald R. Cassady

[57] ABSTRACT

Amorphous boron is deposited in uniform thickness on continuous lengths of carbon monofilament substrate by contacting the substrate with boron trichloride and hydrogen (4:6) at 1,400–1,450°C. by admitting the reactive gases in tangential flow around the filament, useful for forming boron filaments of up to 4 times the diameter of the carbon substrate.

4 Claims, 3 Drawing Figures

RUSSELL J. DIEFENDORF INVENTOR.

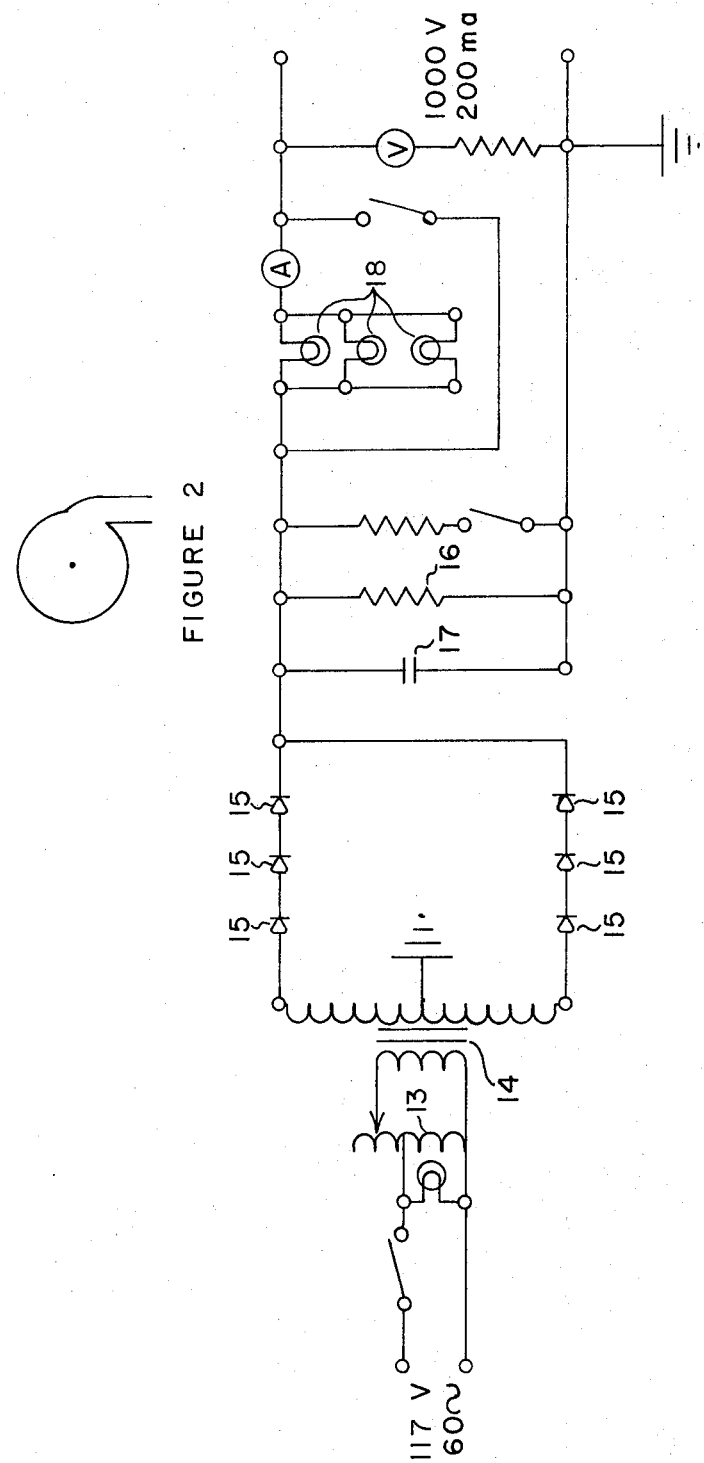

BORON DEPOSITION ON CARBON MONOFILAMENT

BACKGROUND OF THE INVENTION

It has been found that boron filaments suitable for use in a wide variety of structural uses can be effectively prepared by depositing boron upon a heated surface as for example by contacting a halide of boron with such surfaces in the presence of hydrogen. The form and properties of the deposited boron may be determined by controlling the conditions of deposition, particularly the temperature of the heated surface.

Typically, boron filament is prepared by passing a mixture of hydrogen and boron halide, such as boron trichloride, over a metallic or carbon filament heated, for example, by internal electrical resistance, to a preselected temperature. The mixture of hydrogen and boron trichloride can be conveniently made by mixing streams of hydrogen and boron trichloride gases to produce the desired concentration of boron trichloride in the hydrogen leaving the chamber. The mixture thus obtained is passed through a deposition chamber containing the heated surface at a rate effective to maintain a high rate of deposition of boron consistent with maintaining substantial uniformity of conditions of the boron on the substrate.

Depending mainly on the temperature of deposition four different forms of boron can be produced: at temperatures above about 1,327°C $\beta$-rhombohedral boron is formed; between about 1,127°C and 1,327°C tetragonal boron tends to be formed; between about 827°C and 1,227°C $\alpha$-rhombohedral boron can be produced, and between about 1,327°C and 827°C amorphous boron is formed. There is some overlap of the temperature ranges in which the various forms of boron are produced. In particular, within the various ranges the form of boron initially produced tends to persist. For example, if the initial deposition is formed at a low temperature at which amorphous boron is deposited, deposition in the amorphous form may continue even at considerably higher temperatures at which a crystalline form of boron would otherwise be deposited, and if deposition of boron in the $\beta$-rhombohedral form is initiated at temperatures above 1,327°C, deposition in this form may continue even at temperatures as low as 827°C.

This invention relates to the manufacture of filaments of amorphous boron. Such filaments are particularly useful in the preparation of light weight, high stiffness, high strength composite materials when used with a plastic or metal matrix.

Thus, the composites can be used to manufacture pencil-thin golf shafts, stiffening strips in surfboards, rigidizing patches in automobile body shells, and thin spars and the like for the aerospace and aeronautic industry.

OBJECTS OF THE INVENTION

It is an object of this invention to provide a method for the manufacture of continuous lengths of amorphous boron filaments. It is a further object of this invention to provide a method for the manufacture of continuous lengths of amorphous boron of high tensile strength and high modulus of elasticity. It is a further object of this invention to provide an amorphous boron filament uniformly deposited upon a carbon monofilament substrate.

SUMMARY OF THE INVENTION

The above objects can be accomplished by subjecting a carbon filament, prepared by spinning a coil tar pitch or similar resinous material which has been oxidized and carbonized to 1,000–1,200°C. in a non-oxidizing atmosphere as hereinafter described, to a temperature of about 1,400–1,450°C.; contacting the filament with a stream of gases comprising about 60 parts of hydrogen and about 40 parts of boron trichloride by volume to cause deposition of amorphous boron on the filament; and cooling the fiber as deposition of boron occurs to effect continued deposition of amorphous boron on the carbon substrate. The reactive gases are contacted with the filament in a manner to provide maximum cooling and maximum mass transfer of deposition. In order to provide for these goals, a tangential gas flow is utilized wherein the center line of the gas inlet tube is in alignment with the periphery of the reactor tube, as shown in the accompanying figure described below. By the method of this invention, a boron on carbon substrate filament can be manufactured with diameters up to 4 times the original diameter of the carbon filament substrate.

DETAILED DESCRIPTION OF THE INVENTION

In the drawings, which comprise a part of the instant description and are to be read in conjunction therewith, a simplified type of apparatus for carrying out an embodiment of the invention is shown and, in the various views, like numerals are employed to indicate the parts. It should be understood that the shown embodiment is susceptible of modification and change without departing from the spirit of the invention which is particularly pointed out in the appended claims.

Referring to the drawings:

FIG. 2 is a view of the reactor perpendicular to the view of FIG. 1 through A—A of FIG. 1.

FIG. 3 is a typical schematic diagram of a high impedance power source used to heat the carbon filament during the deposition process.

Figure 1:
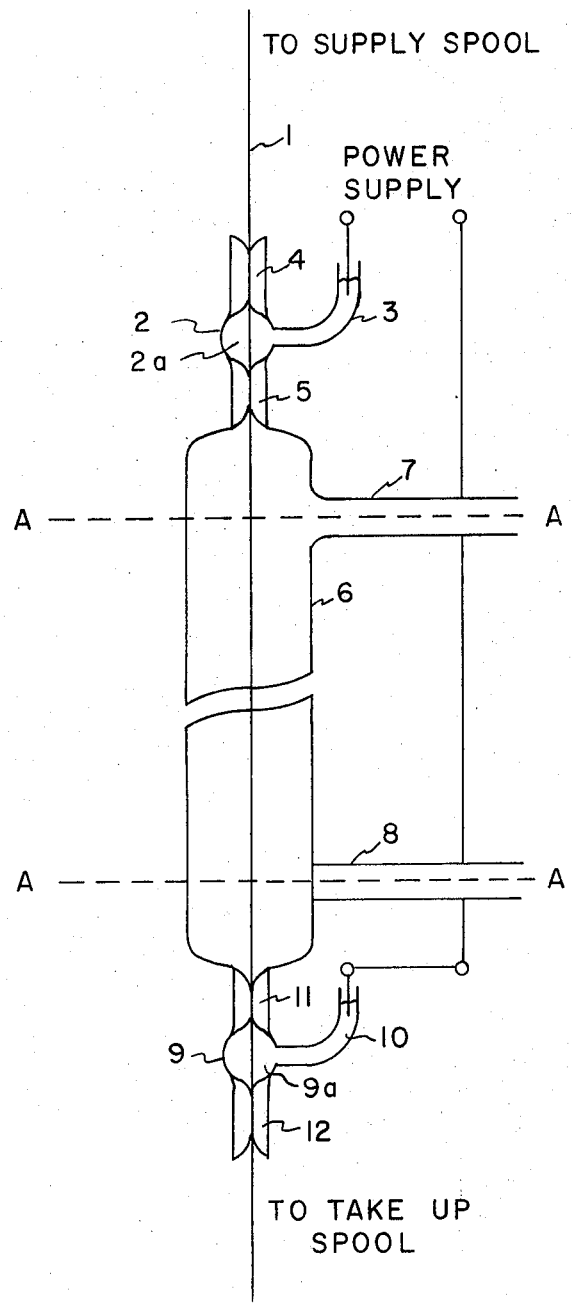
FIG. 1 is a cross-sectional view of a reactor useful for carrying out an embodiment of the invention.

The reactor can be fabricated of any convenient material, preferably of a heat and electrical insulation material, as for example glass or quartz.

In the presently shown model, constructed of glass, the carbon monofilament 1 is fed from a conventional supply spool (not shown) through a chamber 2 containing a pool of mercury 2a which functions as a gas seal and as an electrode to cause resistance heating of the filament. The chamber is equipped with an inlet or stand pipe 3. Two capillary tubes 4 and 5 are provided to allow the filament to pass without leakage of the mercury into the reaction tube 6, which in the present model is a Pyrex brand glass tube, about 22 mm. outside diameter, and about 18 inches long. The reactor is equipped with a tangential gas inlet 7 near the filament inlet end of the reaction tube and a tangential gas outlet 8 near the filament output end of 6 mm. outside diameter Pyrex brand glass tubing. The filament traverses the reactor and then passes through the second mercury electrode chamber 9, containing a pool of mercury 9a, equipped similarly to the electrode chamber 2 with a stand pipe 10 and capillary tubes 11 and 12, and onto a conventional driven take up spool (not shown).

A typical high impedance power supply used to provide a constant potential difference between the mercury electrodes is shown in FIG. 3. Voltage regulation is obtained through the use of a 0–120 V. variable transformer 13, and voltage elevation by a 1,150 V. center tapped transformer 14. Full wave rectification is effected by a manifold of crystal diodes 15 with dampening provided by a parallel resistor 16 - capacitor 17 arrangement. Three 110 V. 7 W. lamps 18 are used as temperature variable resistors in the circuit.

By "carbon filament substrate" as used in this invention, is meant a carbonaceous monofilament prepared from a pitch of coal tar, petroleum, polyvinyl chloride, or similar resinous material when spun into a filament of the desired substrate diameter, and completely oxidized, and carbonized as for example by the method of Otani, U.S. Pat. No. 3,392,216, July 9, 1968. The Otani method includes the steps of (a) heating the starting pitch-like material in an inert gas to a temperature of about 300° to 500°C., (b) bringing the heat treated pitch to a spinning temperature and spinning the material, (c) oxidizing the spun filaments by contact with an oxidizing gas, (d) subjecting the oxidized filament to carbonization by heating in an inert atmosphere at a temperature substantially above 500°C. Typically, this carbon substrate is of 0.5–10 mil diameter and can be manufactured in continuous lengths.

By the method of this invention, the above type carbon filament is passed into the inlet portion of the reactor as shown in FIG. 1 through the pool of mercury acting as one electrode of a DC resistance heating means through the reactor portion then through the mercury pool at the terminus of the reactor zone, which mercury pool acts as the second electrode of the resistance heating means. The initial temperature of deposition of boron should be at a filament temperature of about 1,400°–1,450°C. for the most rapid deposition of amorphous boron. Temperatures higher than about 1,450°C. cause nucleation and deposition of crystalline boron, an undesirable form of boron for the preparation of high strength and high modulus filaments. The temperature of the filament is controlled by three variables, the current flow through the filament, the flow rate of the gases around the filament during deposition, and the radiant heat loss of the reactor into the surrounding atmosphere. Current flow is about 200 ma. at 1,000 V. The flow of gases within the reactor is adjusted to a rate of from about 1 to about 8 cubic feet per hour (cfh), preferably about 2 to about 2.5 cfh at an internal pressure of 0 to 5 psig (1–1.3 atm.). The carbon filament is passed through the reactor at a speed of about 0.5 feet per minute (fpm) to about 3 fpm to allow a total contact of the fiber with the reactive gases of about one-half to 1½ minutes, although an additional contact time can be provided for a greater build-up of boron on the substrate.

Reactive gases, hydrogen and boron trichloride, are admitted in tangential flow near the filament input end of the reactor, and are purged therefrom, after deposition of boron on the carbon substrate, at the cool end of the reactor at such a rate to maintain a slight positive internal pressure on the reactor as of from atmospheric to 1.3 times atmospheric pressure. Ideally, a boron trichloride:hydrogen ratio of about 4:6 (V./V.) is maintained in the reactor, although this ratio can be varied to maintain about 20–50 volume percent of boron trichloride in hydrogen without materially departing from the sprit of this invention. Also, the addition of diluent gases, as for example argon and/or helium, is contemplated to be within the scope of this invention.

The temperature gradient of the filament within the reaction chamber should not be so great as to limit deposition prior to the removal of the filament from the reaction chamber. The temperature gradient within the reactor is dependent upon the decreased resistance of the substrate, as deposition takes place, upon the radiant cooling of the filament, upon the heat transfer to the reactive gases within the chamber, and upon the initial filament diameter.

Although the reactor shown in FIG. 1 is a single stage reactor, it is contemplated that a multi-stage reactor can be utilized to control the cooling rate of the fiber as deposition occurs. In such a case it is advantageous to add a second stage reactor with an inlet for the addition of cool reactive gases immediately past the first reactive chamber so as to lower the temperature of the filament below about 1,400°C. thereby further avoiding nucleation and crystalline boron deposition. The temperature at which the carbon substrate and the reactive gases are contacted in this invention is considerably higher than that used in a conventional parallel flow reactor in which crystalline boron will form at temperatures over about 1,300°C. It is believed that the tangential flow of the reactive gases provides better heat transfer (cooling) from the filament and higher mass transfer (deposition rate), which allows the deposition of amorphous boron at the high temperature of this reaction. By the method of this invention, a filament of high modulus of elasticity (Young's modulus) and strength approaching 300,000 psig can be prepared.

It is the fine diameters filament substrates, of the order of 1 mil and below, that lend themselves to the use of a multi-stage reactor wherein a second or additional inlet of cool or heated reactive gases could be introduced to maintain the temperature of the filament.

In one embodiment, the rate at which the carbon filament substrate is passed through the apparatus is adjusted so that a hot spot, a temperature in excess of 1,500°C. exists at the terminal portion of the capillary where the filament emerges from the mercury electrode pool. In operation, the filament is passed rapidly through the reactor until the hot spot develops and then is slowed until the hot spot orients itself at the terminus of the capillary portion of the inlet tube.

Thus, in its preferred mode, this invention contemplates heating the carbon filament substrate to above 1,500°C. at the outlet portion of the inlet electrode capillary fusing the carbon filament substrate and thereby removing any creep that the carbon filament might possess prior to this point. Immediately thereafter a boron film deposits on the brittle substrate. The deposited boron, which elongates during deposition, apparently shatters the filament in a series of cracks parallel to the diameter of the filament. The absence of the rigid substrate then allows the deposited boron to expand linearly as deposition occurs with no regard for the rigid substrate which would be present if the shattering did not occur. In this manner there is no strain mis-match during deposition of the boron coating between the boron sheath and the carbon monofilament. In depositions where the carbon monofilament is not heat treated to well above the boron deposition temperature, the carbon monofilament fractures occasionally at a later time in the deposition. This late fracture causes an increase in resistance resulting in a "hot spot" which is detrimental to the process and the strength of the filament. In the present preferred process, the carbon monofilament is uniformly shattered into short lengths, such that the temperature of the filament is maintained with a uniform gradient. This provides a high strength filament and a process of high operability.

What is claimed is:

1. In the continuous deposition of boron on a carbon filamentous substrate to form a boron filament in a reactor comprising a reaction tube and a gas inlet tube and gas outlet tube attached thereto, which comprises contacting the substrate with reactive gases comprising a mixture of boron trichloride and hydrogen and heating the substrate to a temperature sufficient to decompose the reactive gases thereby depositing amorphous boron on the substrate, the improvement which comprises initially resistively heating the substrate to above about 1,500°C, shattering said substrate and then contacting the substrate with the reactive gases in tangential flow at about 1,400–1,450°C., the center line of the gas inlet tube being in alignment with the periphery of the reaction tube to provide such tangential flow, and providing that the reactive gases and the filament traverse the reactor in the same direction to effect cooling of the filament while it is being coated.

2. The process of claim 1 in which the reactive gases consist of about 20 to 50 parts of boron trichloride and 80 to 50 parts of hydrogen.

3. The process of claim 1 in which the reactive gases consist of about 40 parts of boron trichloride and 60 parts of hydrogen.

4. The process of claim 1 in which the reactive gases contact the fiber for a total time of about one-half to 1½ minutes.

* * * * *